UNITED STATES PATENT OFFICE.

ROBERT E. SCHMIDT AND PAUL TUST, OF ELBERFELD, GERMANY, ASSIGNORS TO THE FARBENFABRIKEN OF ELBERFELD COMPANY, OF NEW YORK, N. Y.

BLUE CHRYSAZIN DYE AND PROCESS OF MAKING SAME.

SPECIFICATION forming part of Letters Patent No. 656,730, dated August 28, 1900.

Application filed August 25, 1899. Serial No. 728,397. (Specimens.)

*To all whom it may concern:*

Be it known that we, ROBERT E. SCHMIDT, doctor of philosophy, chemist, and PAUL TUST, chemist, both residing at Elberfeld, Germany, (assignors to the FARBENFABRIKEN OF ELBERFELD COMPANY, of New York,) have invented a new and useful Improvement in Blue Chrysazin Dye; and we hereby declare the following to be a clear and exact description of our invention.

Our invention relates to the production of a new blue dyestuff, which is a monosulfonic acid of monobromdiamidochrysazin, by treating monobromdinitrochrysazin monosulfonic acid with suitable reducing agents.

The monobromdinitrochrysazin monosulfonic acid employed as starting material in our new process has the following properties: It is an orange crystalline powder which dissolves in water with a yellow color, in a dilute soda lye with a brownish-yellow color, and in ammonia liquor with a violet-red color. By concentrated sulfuric acid it is dissolved with a yellow color. If boric acid is added to the sulfuric-acid solution the color changes into yellowish red.

In carrying out our new process practically we may proceed as follows, the parts being by weight: To a solution of twenty parts of monobromdinitrochrysazin monosulfonic acid in two thousand parts of water a solution prepared from forty-eight parts of stannous chlorid, one hundred and thirty parts of concentrated hydrochloric acid, and one hundred and thirty parts of water is added at about from 50° to 60° centigrade. After a short while the color of the mixture will change into blue, the new diamido acid being partially separated during the reaction. When the reduction is finished, a hundred parts of hydrochloric acid are added. Subsequently the new dyestuff is isolated by filtration. Finally it is pressed, dried, and pulverized. It is thus obtained in the shape of a dark-blue powder which is easily soluble in hot water with a blue color and soluble in dilute alkalies with a pure-blue color. By concentrated sulfuric acid it is dissolved with a yellow color, which on the addition of boric acid changes into a pale-red color.

The new coloring-matter dyes unmordanted wool in acid-baths bright-blue shades, while it yields on chrome-mordanted wool bright and fast greenish-blue shades.

Having now described our invention and in what manner the same is to be performed, what we claim as new, and desire to secure by Letters Patent, is—

1. The process for producing a new blue dyestuff being a monobromdiamidochrysazin monosulfonic acid, which process consists in first heating a mixture prepared from monobromdinitrochrysazin monosulfonic acid, stannous chlorid and hydrochloric acid, secondly isolating the dyestuff thus produced and finally drying the same, substantially as hereinbefore described.

2. As a new article of manufacture the new dyestuff being a monobromdiamidochrysazin monosulfonic acid which when dry and pulverized is a dark-blue powder, easily soluble in hot water with a blue color, soluble in dilute alkalies with a pure-blue color, being dissolved by concentrated sulfuric acid with a yellow color which on the addition of boric acid changes into a pale red, dyeing unmordanted wool in acid-baths bright-blue shades, while it yields on chrome-mordanted wool bright and fast greenish-blue shades, substantially as hereinbefore described.

In testimony whereof we have signed our names in the presence of two subscribing witnesses.

ROBERT E. SCHMIDT.
PAUL TUST.

Witnesses:
R. E. JAHN,
OTTO KÖNIG.